Patented Apr. 24, 1934

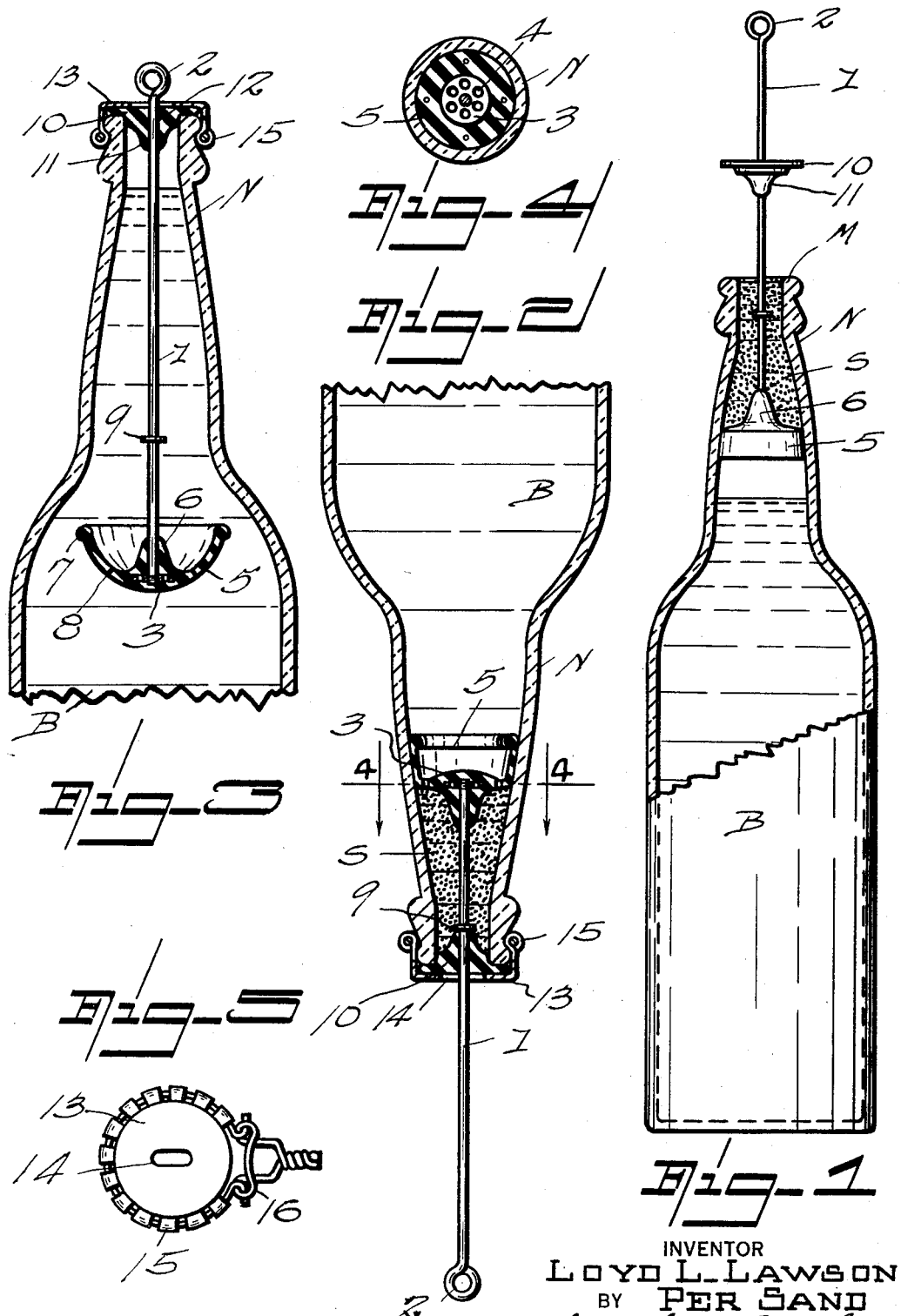

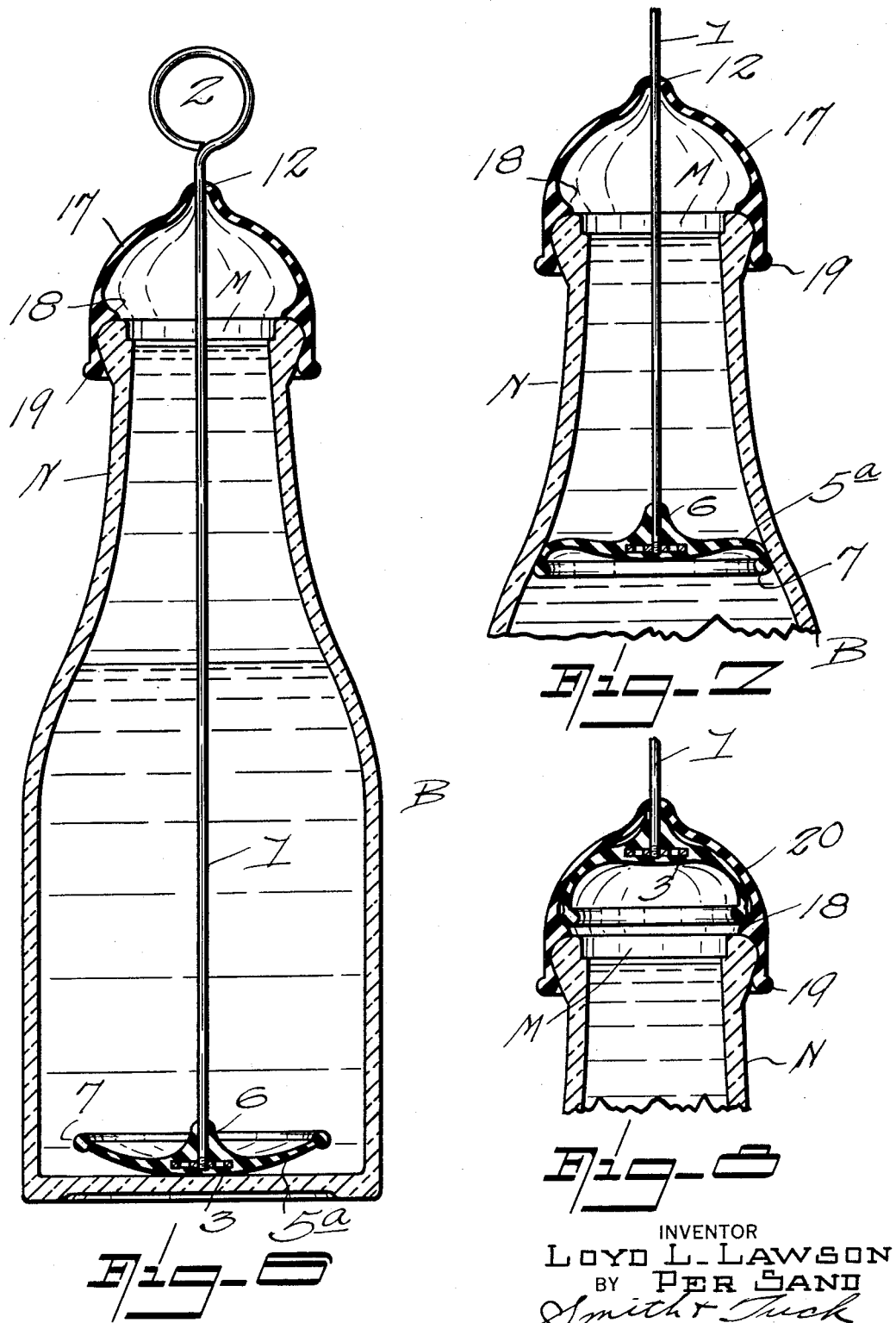

1,955,853

UNITED STATES PATENT OFFICE 1,955,853

LIQUID SEPARATOR

Lloyd L. Lawson, Renton, and Per Sand, Seattle, Wash.

Application October 7, 1931, Serial No. 567,507

3 Claims. (Cl. 210—57)

Our present invention relates to an improved liquid separator for use in connection with bottles, and in combination with the bottle closure. The device of our invention is designed for use with bottles containing beverages, such as home-brew drinks in which the beverage is charged with an effervescent gas or a gas that is developed within the liquid beverage, and in its special application to home brew, and similar "soft" drinks or beverages, the device of our invention is employed in the separation of the sediment that collects at the bottom of the bottle. Thus the objectionable solids present in the liquid are permitted to settle or collect at the bottom of the bottle of beverage, and the separator of our invention is employed to withdraw this sediment prior to the consumption of the beverage.

In its applied use with a milk bottle, or bottle of milk, the separator is employed to separate the cream from the top of the milk, in order that the cream may be poured off the milk without materially disturbing the latter.

In carrying out our invention we employ a combined closure and separator, the latter in the form of a reversible or invertible rubber separator-head mounted on a stem that is slidable in the bottle closure in order that the separator head may be moved from inactive or inoperative position to active or operative position, and vice versa, with facility and with reliability for the performance of its functions.

The invention consists in certain novel combinations and arrangement of parts as will hereinafter be more fully set forth and claimed. In the accompanying drawings we have illustrated our invention physically embodied for use with a liquid beverage bottle of the home brew type, and also with a milk bottle, and the parts are combined and arranged according to the best modes we have thus far devised for the practical application of the principles of our invention. It will of course be understood that the device of our invention is applicable for use in various other ways and for other purposes than the two exemplified used in the drawings.

Figure 1 is a view of a bottle partly broken away, showing the separator in active position for removing the accumulated sediment from the bottle.

Figure 2 is a sectional view of the bottle and of the separator, the bottle being shown in inverted position to collect the sediment, and the separator in position to compact the sediment preparatory to its removal from the bottle.

Figure 3 is a sectional view of part of the bottle and of the separator, showing the latter in inactive position, but with the bottle closed.

Figure 4 is a transverse sectional view at line 4—4 of Figure 2.

Figure 5 is a top plan view of the bottle closure and closure fastener.

Figure 6 is a sectional view of a milk bottle, closed, with the separator in inactive position.

Figure 7 is a sectional view at the top of the milk bottle, which is closed, and with the separator in active position.

Figure 8 is a sectional detail view illustrating the separator head employed as a bottle closure.

In order that the general relation and the utility of the parts may readily be understood we have shown and designated a bottle as B having the neck N and mouth M, and the sediment that is collected and is to be removed from the contents of the bottle is designated S. In Figures 1 through 3 it will be understood that after the bottle B has been filled with the liquid beverage, the bottle is closed and sealed, and then inverted and placed in a rack or other support. The bottled beverage is maintained in this position a sufficient length of time to permit the sediment to collect in the neck N of the bottle, the separator remaining in inactive position during the time for collection of the sediment.

After the sediment has been collected, the separator is pulled to active position of Figure 2, the bottle is righted, the closure removed, and the separator is employed to retain the liquid beverage while the trapped sediment is displaced in suitable manner, leaving the beverage clear and free of sediment.

For facility and convenience in carrying out our invention we employ a stem 1 of suitable wire and proper length, which is provided with a looped handle 2, and at one end, the end opposite to that of the handle 2, the stem is provided with a rigid, metal head plate 3 in the form of a circular disk that is fashioned with perforations 4 to assist in anchoring the separator head in and on the head plate.

The separator head 5 is fashioned of rubber in hemispherical shape, and the boss 6 of the head is molded on the stem to assist in anchoring the head on the plate, the latter being embedded in the wall of the hemispherical head. The head is thus fashioned with a cup shape, and as the head may be reversed or inverted, and is fashioned of resilient or elastic material, it may be passed through the mouth and neck of the bottle notwithstanding the fact that it has a diameter, which under normal conditions, is greater than the diameter of the mouth M and the neck N of the bottle B.

To insure a close frictional wiping contact of the free edge of the hollow hemispherical head 5 against the surface of the neck of the bottle, the head is provided with an exterior rounded flange or annular bead 7, and to provide against excessive pressure of effervescent or, other gases in the bottle, the wall of the hollow head may be pierced as at 8. With the bottle in position of Figures 1 and 2, because of the resiliency or elasticity of the rubber, the cramped or restricted head closes these openings 8 to prevent escape of the gas if a normal pressure is present in the bottled beverage. If an excessive pressure of gas is present in the bottle, however, these openings will be dilated slightly to permit passage of the gas under excessive pressure, thus gradually reducing the pressure of gas to normal degree. If the excess pressure is abnormally high degree, the escaping gas will assist in clearing out the sediment when the bottle is uncorked as in Figure 1.

On the stem 1, within the bottle, a collar 9 is rigidly fixed which, as shown in Figure 2, limits the movement of the separator by contact with the bottle closure 10 to prevent excessive compression of the sediment and possible removal of the closure while the sediment is being collected or trapped as in Figure 2.

The bottle closure 10 is fashioned in the form of a circular disk of rubber, and is fashioned with a supporting boss 11, through which extends an opening 12 from the top of the closure. The resilient and elastic closure is adapted to form a compressed gasket or seal in the mouth M of the bottle to provide a gas tight and liquid tight joint for the bottle, and a closure fastener of suitable type is employed to fasten the closure in the mouth of the bottle.

The closure-fastener includes a metal cap 13 with a slot 14 therein to accommodate the looped handle 2, and the crimped edge of the closure-cap 13 is fastened about the exterior of the mouth of the bottle by means of cord or wire fasteners 16.

The stem has a sliding fit within the hole 12 of the closure 10 and its boss 11, but the slot 14 of the cap is of sufficient size to receive the loop 2 and the latter may be depressed into the slot to compactly close the hole 12 and frictionally engage its wall with the stem to prevent escape of gas or of the liquid contained in the bottle.

The slot 14 also permits the eye or loop handle 2 to be projected through the cap 13, as the cap is slipped down into place on the top of the closure and over the mouth of the bottle, it being understood that the stem is slipped through the closure opening 12 before the loop handle is fashioned on the upper end of the stem.

The closure fits around the stem with sufficient friction to prevent escape of the liquid beverage and of gas, and the closure also grips the stem with sufficient friction to hold the stem and the separator head upright in the bottle when the latter is inverted. Thus, when the bottle is inverted, the stem and the separator head maintain the same relation to the bottle as indicated in Figure 3, and the sediment is free to collect in the neck of the bottle, without obstruction from the separator head. After the sediment has collected in the neck of the bottle, the separator head is pulled to the position of Figure 2 to trap the sediment in the neck of the bottle.

In Figures 6 and 7, where the device is utilized to separate cream from milk in a milk bottle, the separator head 5a is cup shaped, but has less depth than the hemispherical separator head 5. The closure 17 in which the stem is adapted to slide is fashioned as an inverted cup and provided with an interior annular flange 18 to seat on the mouth M of the bottle, and an exterior flange or annular bead 19 is formed on the rim of the inverted cup. The closure or inverted cup is thus formed with an inner annular groove between these two flanges, which groove conforms to the shape of the bead about the mouth of the bottle and insures a tight fit of the closure on the bottle mouth. The separator head 5a is of greater diameter than the neck of the bottle, but its resiliency or elasticity permits the head to be slipped through the neck to pass the separator head and stem into the bottle as in Figure 6. When the cream is to be separated and drawn off from the milk in the bottle, the separator head is elevated to position of Figure 7 and the separator head is deformed to the shape indicated for frictional engagement with the wall of the neck, thereby separating the cream from the milk, and permitting the cream to be poured from the bottle without materially disturbing the milk.

In Figure 8 a modified form of the inverted cup-closure is indicated at 20 for use in closing the milk bottle temporarily, and this closure, as will be noted is of substantially the same formation as the separator head 5, but inverted, of Figure 3.

Having thus fully described my invention, what I claim as new and desire to secure by Letters Patent is:—

1. In a liquid separator for a bottle, the combination with a closure, of a stem slidable in the closure, a head plate rigid with the stem, a hollow rubber obturating separator head secured on the head plate, and said separator-head adapted to be distorted so as to provide a skirt portion in intimate contact with the bottle neck of an area greater than the cross-sectional area of the bottle neck.

2. In a liquid separator for a bottle, the combination with a closure, of a stem slidable in the closure, a head plate rigid with the stem, a hollow rubber obturating separator head secured on the head plate, said separator-head pierced with openings normally closed but adapted to dilate and permit the escape of excessive pressure, and further said separator-head adapted to be distorted so as to provide a skirt portion in intimate contact with the bottle neck of an area greater than the cross-sectional area of the bottle neck.

3. An obturating means, of resilient material, for a bottle consisting of an upwardly extending boss, a hollow head adapted to form a downwardly extending skirt for engagement with a bottle neck, said skirt having an area greater than the cross sectional area of the bottle neck and means for retracting said obturating means.

LLOYD L. LAWSON.
PER SAND.